Dec. 18, 1951        G. W. DUNHAM        2,579,309
WASHING MACHINE OF THE SPIN DRY TYPE
Filed March 21, 1947        9 Sheets-Sheet 1
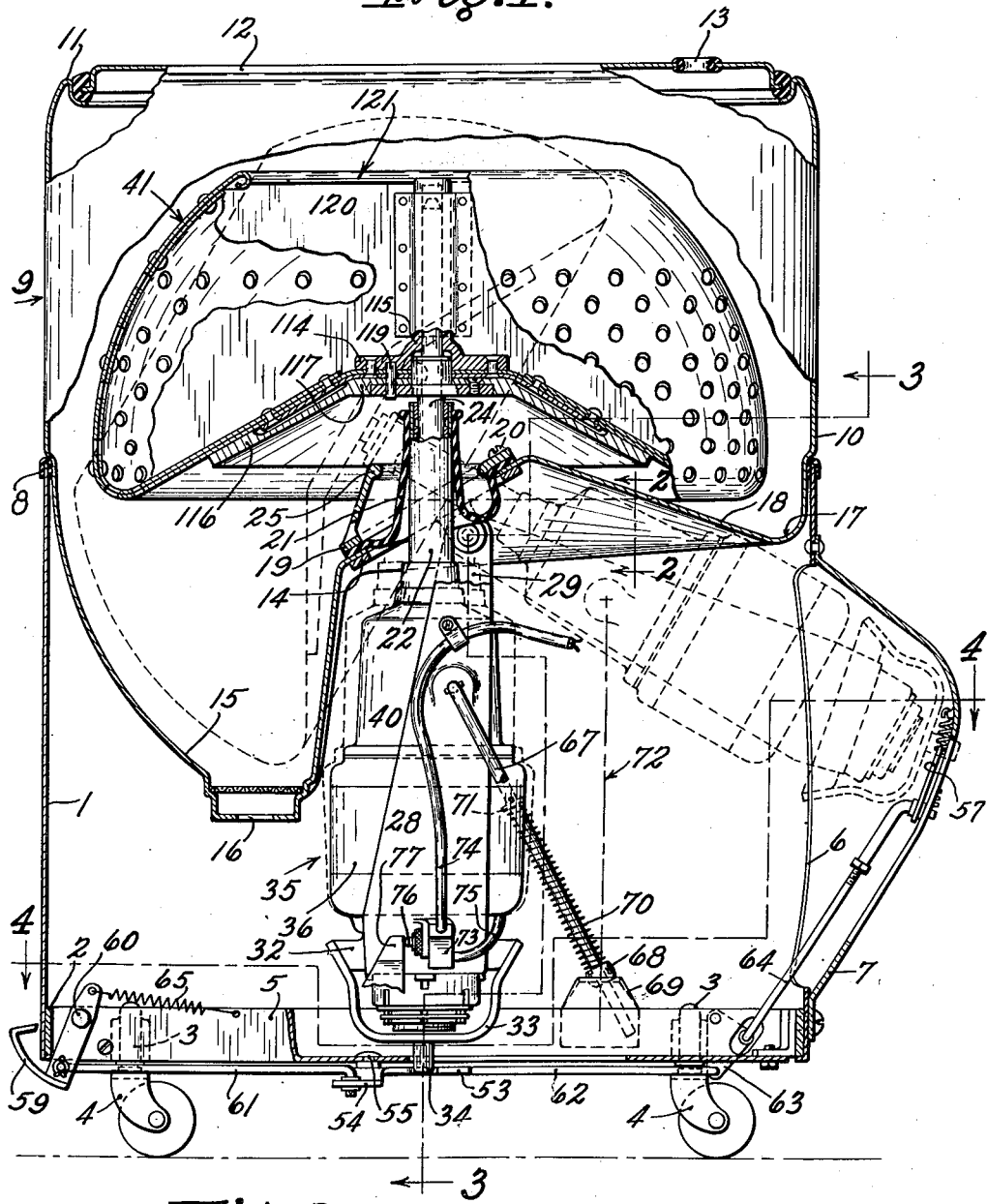
INVENTOR
GEORGE W. DUNHAM
BY Chapin & Neal
ATTORNEYS

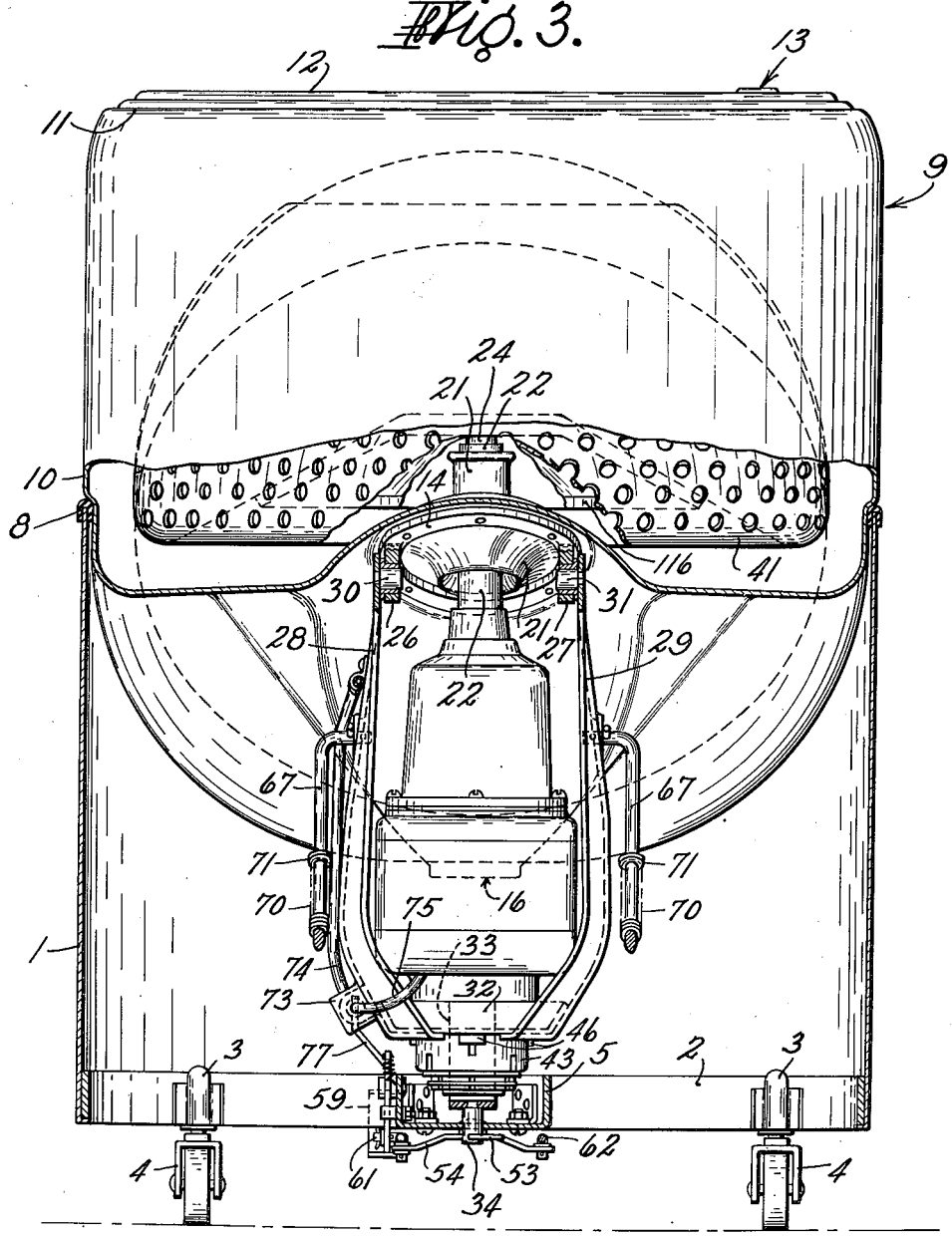

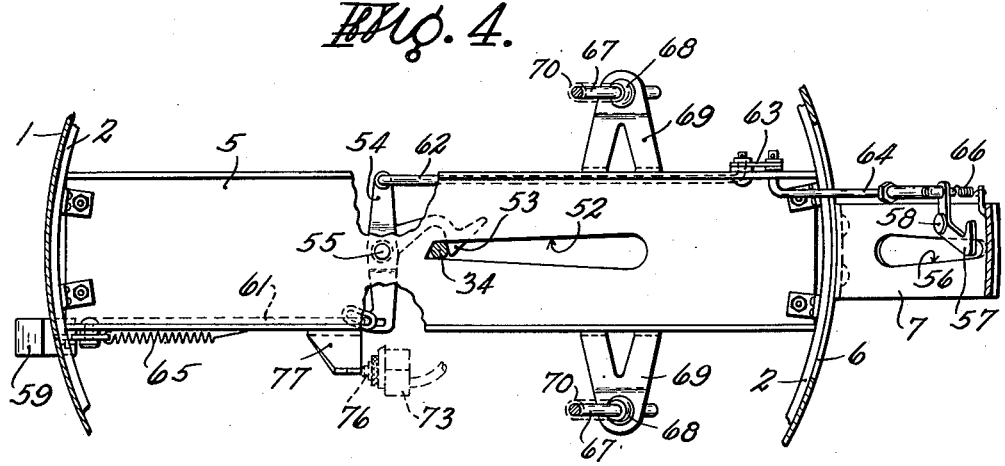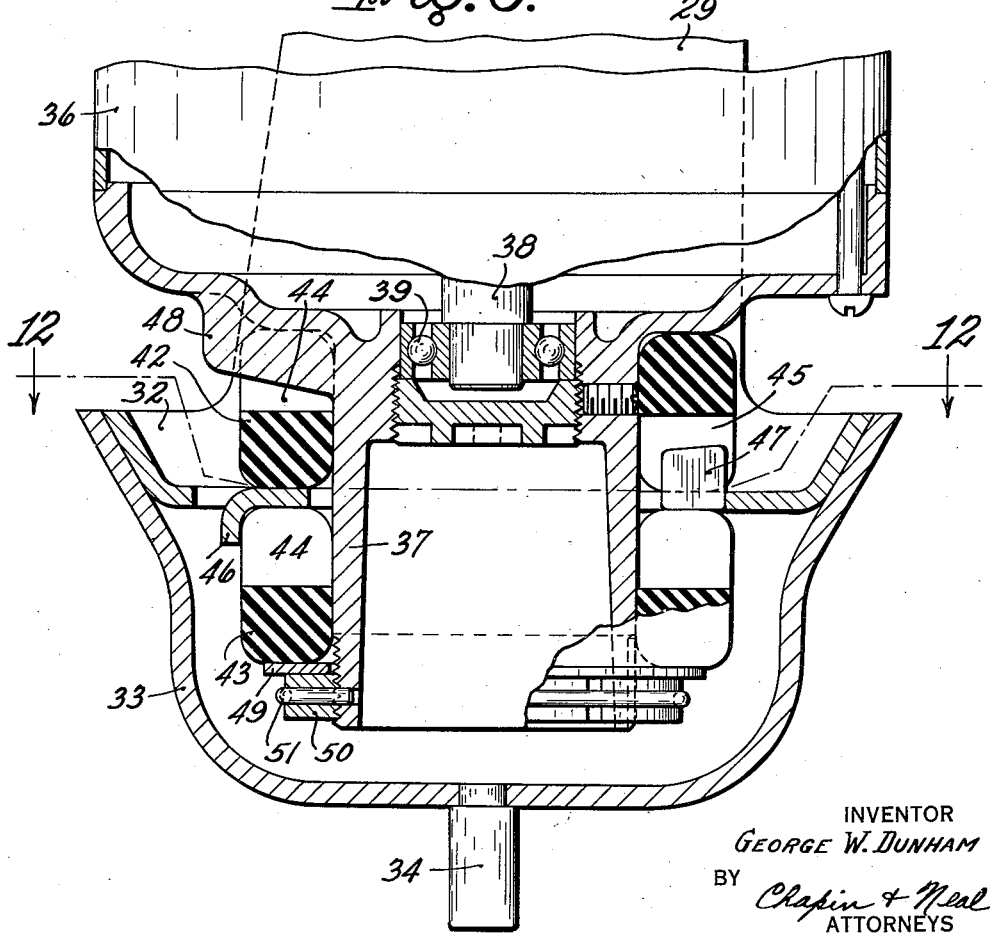

INVENTOR
GEORGE W. DUNHAM
BY Chapin & Neal
ATTORNEYS

Dec. 18, 1951          G. W. DUNHAM          2,579,309
WASHING MACHINE OF THE SPIN DRY TYPE

Filed March 21, 1947          9 Sheets-Sheet 6

INVENTOR
GEORGE W. DUNHAM
BY Chapin + Neal
ATTORNEYS

INVENTOR
GEORGE W. DUNHAM
BY Chapin & Neal
ATTORNEYS

Dec. 18, 1951 G. W. DUNHAM 2,579,309
WASHING MACHINE OF THE SPIN DRY TYPE
Filed March 21, 1947 9 Sheets-Sheet 8

INVENTOR
GEORGE W. DUNHAM
BY Chapin & Neal
ATTORNEYS

Dec. 18, 1951 G. W. DUNHAM 2,579,309
WASHING MACHINE OF THE SPIN DRY TYPE
Filed March 21, 1947 9 Sheets-Sheet 9

INVENTOR
GEORGE W. DUNHAM
BY Chapin + Neal
ATTORNEYS

Patented Dec. 18, 1951

2,579,309

UNITED STATES PATENT OFFICE 2,579,309

WASHING MACHINE OF THE SPIN DRY TYPE

George W. Dunham, Westport, Conn., assignor to Savage Arms Corporation, Utica, N. Y., a corporation of Delaware Application March 21, 1947, Serial No. 736,295

12 Claims. (Cl. 68—25)

This invention relates to a washing machine of the spin dry type adapted for operation through the usual cycles of soaking, washing, rinsing and spinning dry either under manual or full automatic control.

The present invention embodies certain principles of operation and construction disclosed in my previous Patent 1,842,154, January 19, 1932, and aims at the further development of this type of machine in adapting the same for automatic operation and for more efficient and satisfactory performance.

In machines of this character it is the practice to operate the clothes holder or basket at relatively low speed for washing and at relatively high speed for spin drying or centrifuging. One object of my invention is to provide an improved form of two-speed transmission for this purpose and to effect the transition from one operation to the other quickly and without shock. To this end I employ a reversible electric motor and a pair of opposed overrunning clutches which drive through one transmission when operating in one direction, and through the other transmission when reversed. Preferably the spinner shaft and its basket are driven in the same direction for both operations of the motor whereby said spinner shaft may be merely slowed down for washing and speeded up for centrifuging. Brake mechanism is preferably employed to hasten the slowing down of the spinner shaft for the transition from high speed to low speed operation.

A further object of my invention is to provide a structure of the vertical axis centrifuging type which is largely self-balancing by a gyratory action obtained by a so-called columnar unit comprising the spinner shaft with the revolving basket of clothes at the upper end thereof and with the motor and its transmission in axial symmetrical disposition below the basket, the entire unitary structure being supported at its lower end in a resilient mounting, which permits the mass to gyrate about its approximate center of gravity without serious disturbance to its outside supporting structure regardless of the size and kind of load in the basket, and within reasonable limitations, regardless of how said load is distributed.

As in my previous patent referred to, the basket is in vertical position for the centrifuging or spin dry operation and is tilted to an inclined position for the low speed washing operation. The entire columnar unit is pivotally hung from a trunnion bearing for this purpose and a reversible switch for the motor is arranged to automatically reverse said motor when the unit is swung from one position to the other. In the present embodiment the positional shift of the columnar unit is affected by hand, but the construction is easily adapted for power operation should it be desired to convert the present machine to full automatic operation by the addition of valves, and servo-motor devices under the control of the conventional electric timer and circuits now well known in the art.

Further objects and advantages of my invention will be apparent from the following detailed description taken in connection with the accompanying drawings in which, Fig. 1 is a side view of the machine partly in section showing by solid lines the motor and basket assembly in spinning position and by dotted lines the same in washing position;

Fig. 2 is a detail section at 2—2 in Fig. 1 to show the hump in the right half bottom of the tub;

Fig. 3 is a view at right angles to Fig. 1 and partly in section along the broken line 3—3 of Fig. 1;

Fig. 4 is a sectional view taken along line 4—4 of Fig. 1;

Fig. 5 is a detail view in vertical section through the lower end of the motor housing and showing the rubber mounting between said motor housing and stirrup. This view is along irregular line 5—5 of Fig. 12.

Figure 6:
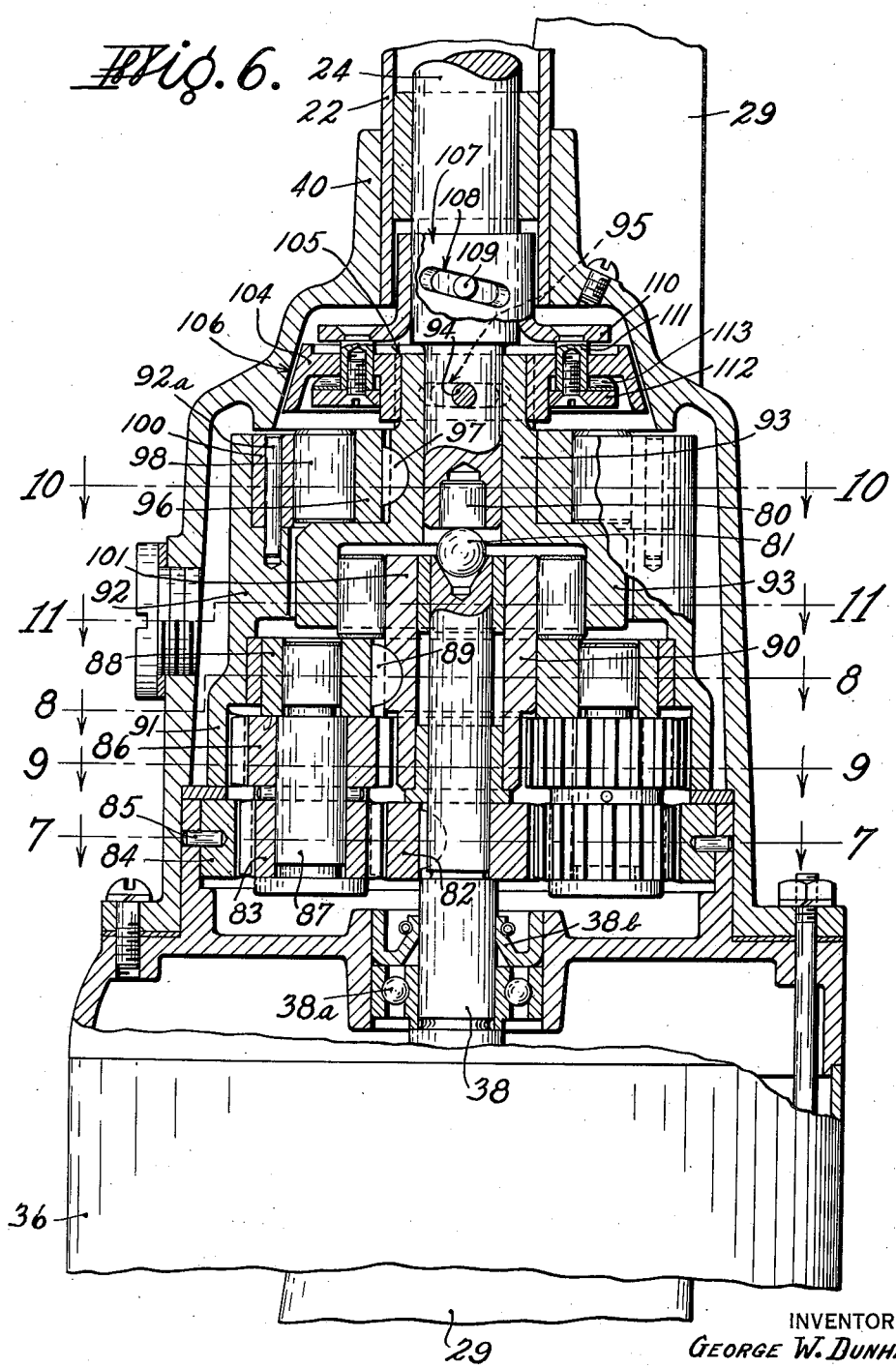
Fig. 6 is a vertical section of the transmission at the upper end of the motor casing.
Figure 7:
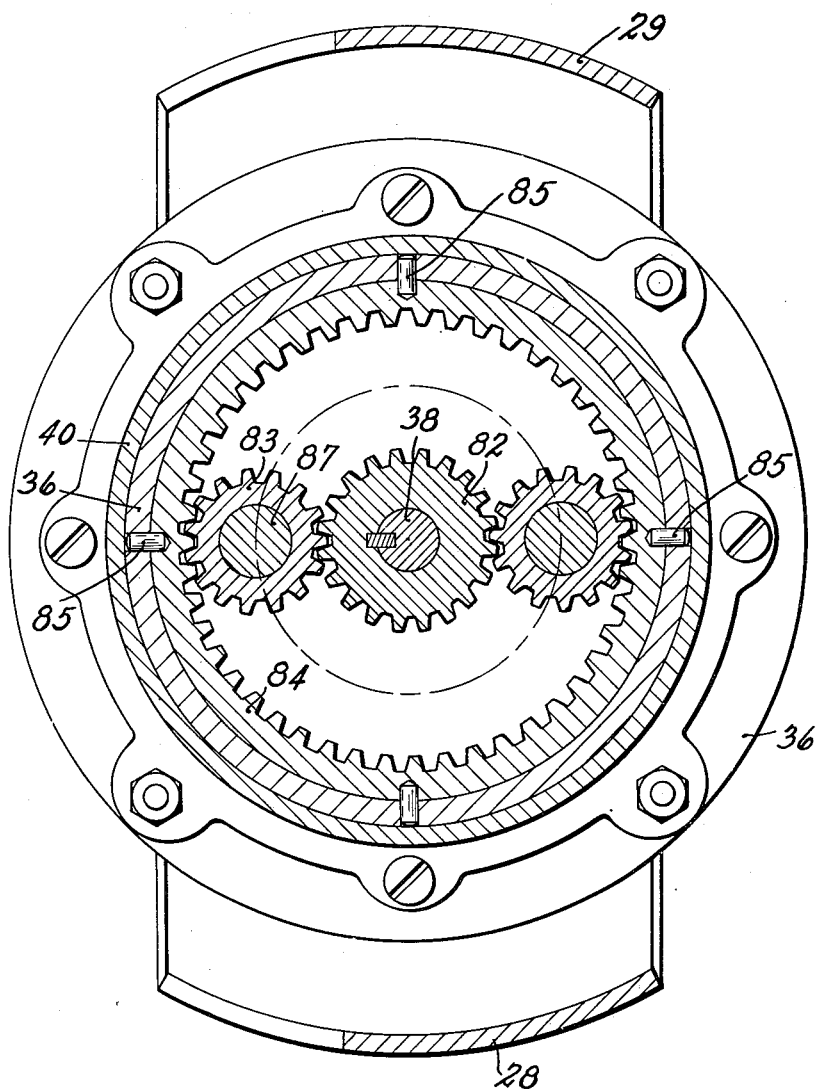
Figure 8:
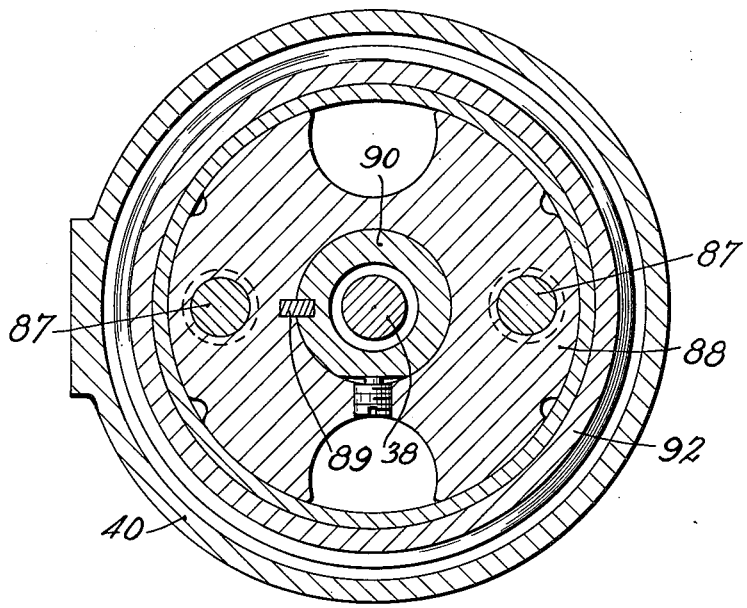
Figure 9:
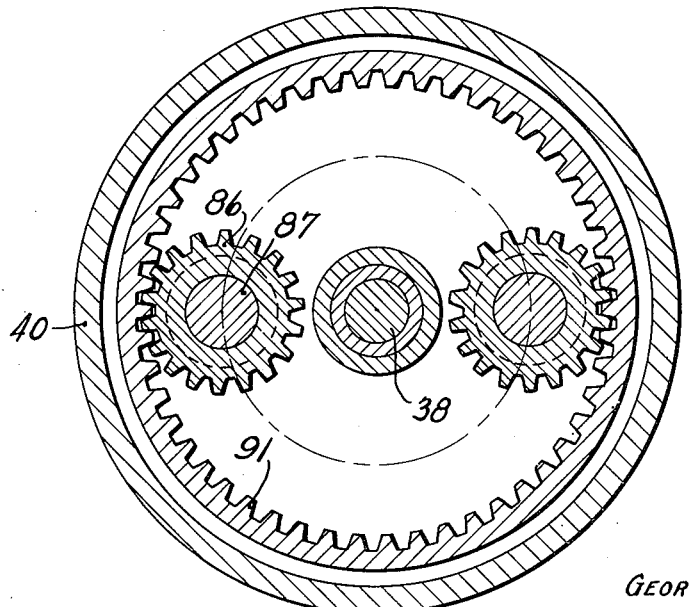
Figure 12:
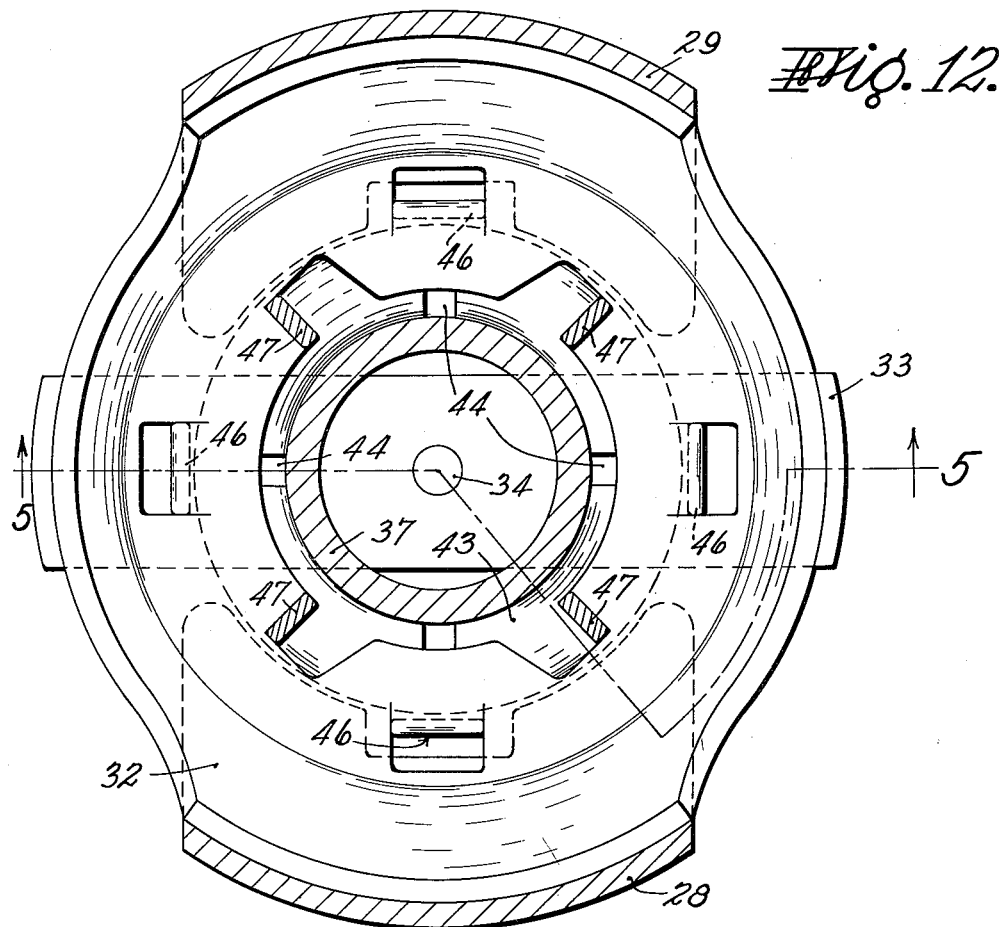
Figure 13:
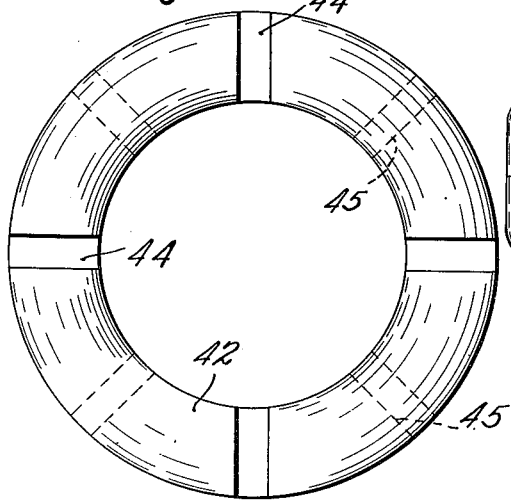
Figure 14:
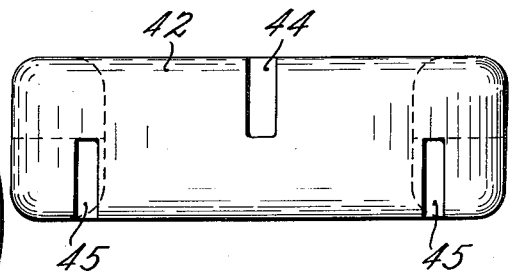
Figure 15:
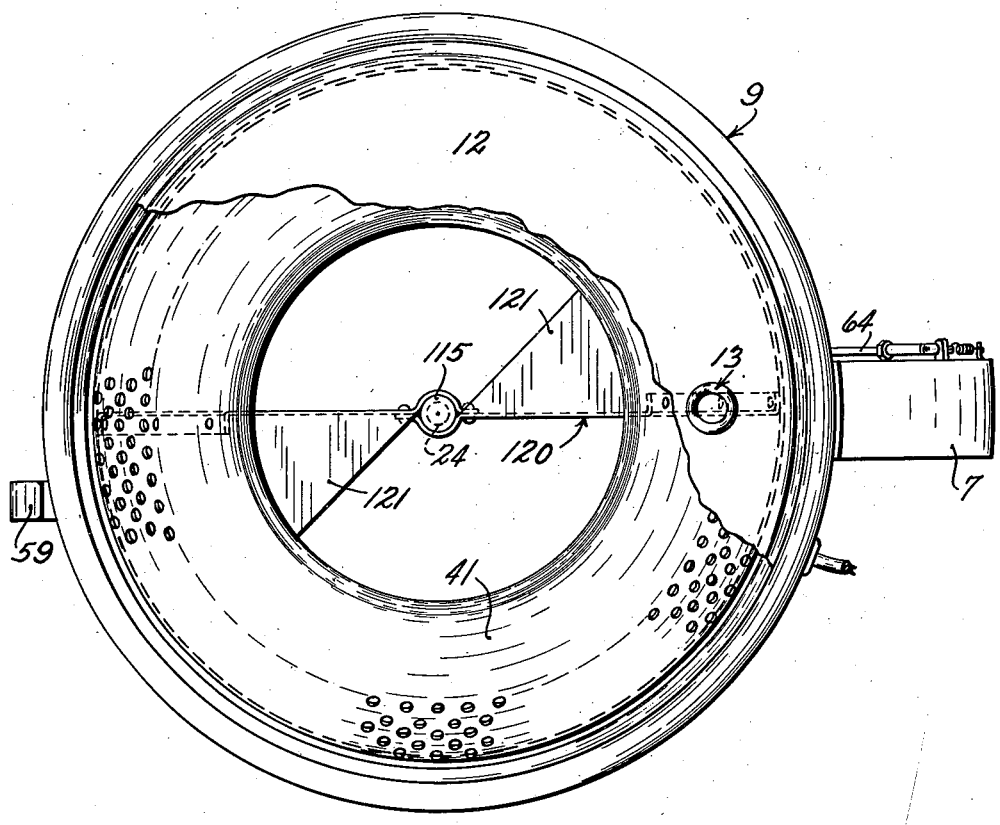
Figure 16:
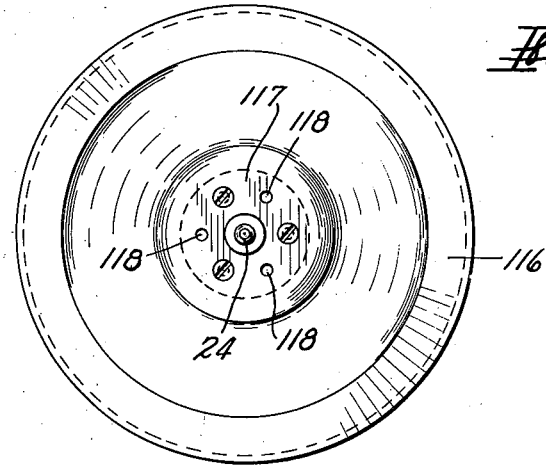

Figs. 7 to 11 inclusive are horizontal sections along lines corresponding to the said figure numbers respectively in Fig. 6;

Fig. 12 is a sectional view looking down from line 12—12 in Fig. 5;

Figs. 13 and 14 are plan and side views respectively of the rubber doughnut used in the mounting at the lower end of the motor housing;

Fig. 15 is a top plan view of the machine with part of the tub top broken away to show the upper end of the basket; and Fig. 16 is a detail top plan view of the conical base support for the basket showing the mounting holes for receiving the basket base studs.

Referring more particularly to the drawings, the main support or cabinet for the machine indicated at 1 is cylindrical and has welded to its lower end a base ring 2. Caster brackets 3 fastened to this ring carry the usual swivelled casters 4. A channel beam 5 extends diametrically across the open ring 2 and, as shown in Fig. 4, carries certain parts of the machine later to be described. The right side of the cabinet 1 looking at Fig. 1 is cut away with a vertical opening 6 which is bridged by an outwardly bulging strap 7 extending from top to bottom of said opening. This construction provides the accommodation for an inclined position of the motor housing as shown in dotted lines in Fig. 1. If the lower cabinet 1 were square, one of its corners could be suitably used for this arrangement.

In the top circular rim 8 of the cabinet 1 is fixedly positioned the tub indicated generally at 9 and having a cylindrical side wall 10 and top rim 11 defining an entrance opening and adapted to be closed by removable cover 12. 13 indicates a grommeted finger hold in said cover by which it may be handled. If desired an encircling clamp band or hoop (not shown) may be provided adjacent rim 8 so as to firmly hold the tub in its stationary position.

Centrally located in the bottom of the tub 9 is an obliquely inclined base ring 14 which provides a radial clearance for the spinner shaft as will be later described. The tub bottom is fastened to this base ring and the left half 15 of said tub bottom (see Fig. 1) is projected downwardly to form a relatively deep basin to hold water for the usual soaking, washing and rinsing operations. The water will be introduced through the top entrance of the tub, and will be drained through the outlet 16 by a suitable emptying pump (not shown). The right half 17 of said tub bottom slopes gently downward from the side wall 10 toward the deep basin 15 so as to drain thereinto, and is formed with a radially extending hump 18 as shown in Fig. 2 to provide accommodation for the inclined position of the motor housing indicated in dotted lines in Fig. 1.

A clamping ring 19 secures the inner peripheral edge of the tub bottom to its base ring 14 by means of screw studs 20. This clamping means 19 also secures for a seal tight joint the lower edge of a flexible rubber boot 21, the upper edge of which is securely fastened by a seal tight joint to the upper end of a tubular neck extension 22 from the transmission case 40, which extension provides a bearing for the spinner shaft 24. The boot 21 thus closes the radial clearance space between the base ring 14 and intersecting spinner shaft in all positions of said shaft. At the left side of the clamping ring 19 a vertically disposed integral shoulder 25 serves as a resting abutment for the neck 22 when the columnar unit is in its inclined position as shown in dotted lines in Fig. 1.

The base ring 14 has integral with its lower side a pair of bearing lugs 26 and 27 (see Fig. 3). A dependent hanging stirrup formed with side arms 28 and 29 has at the upper end of said arms stirrup trunnions 30 and 31 which are pivotally hung in said bearing lugs 26 and 27. The lower end of said stirrup arms 28 and 29 are welded to opposite sides to a stirrup foot ring 32 which has an upwardly flanged rim to which said side arms are joined and a central opening through which a lower extension of the motor casing extends as will be described. A depending U-shaped strap 33 is also welded to the flange of the stirrup foot 32 and the bottom of this strap carries fixed thereto a downwardly projecting pin 34 which serves for retaining the stirrup and its supported parts in different positions as will be described.

The so-called columnar unit of the machine, indicated generally at 35, comprises a motor housing 36 containing an electric motor of the reversible type (not shown). The lower end of said housing has a tubular extension 37 which projects through the opening of the stirrup foot, and the lower end of motor shaft 38 is supported in an annular ball bearing 39, carried in said motor casing as shown in Fig. 5. Upon the upper end of said motor housing 36 is fastened the transmission casing 40 within which the transmission is mounted and the spinner shaft 24 and motor shaft 38 extend into said casing 40 in end to end coaxial relation as shown in Fig. 6. The upper projecting portion of the motor shaft 38 is supported in the annular ball bearing 38a at the top of the motor housing. 38b indicates an oil seal packing gland for said bearing. The clothes holder or basket 41 is carried on the upper end of the spinner shaft 24 for rotation therewith and will be described more in detail hereinafter.

The entire columnar unit comprising the parts just described is supported at its lowermost end in the foot ring 32 of the stirrup by a resilient mounting which permits limited gyration of said unit about its center of mass during the high speed operation of the spinner shaft in centrifuging. As shown in Fig. 5, the lower tubular extension 37 from the motor housing is encircled by two doughnut-shaped rings of rubber or similar resilient material indicated at 42 and 43. Both these doughnut rings are alike and having the shape and configuration shown in Figs. 13 and 14. As therein shown, each doughnut such as 42 has cut part way into its upper side, slots 44, and cut part way into its lower side similar slots 45 which are in staggered relation with those on the upper side. These doughnuts 42 and 43 are positioned respectively above and below the foot ring 32 of the stirrup. Bent down ears 46 from said foot ring 32 embrace the outer side of lower doughnut 43 to hold the same in position, and bent up tongues 47 from said foot ring 32 engage in the lower slots 45 of the upper doughnut 42 to retain the same. Also integral tongue-like webs 48 are projected downwardly from the lower end of the motor housing at intervals to engage in the upper slots 44 of the upper doughnut 42, all as shown in Fig. 5. A retaining annulus 49 is located below the lower doughnut 43 and is held in position by an end nut 50 and snap lock ring 51. It will be noted that while no parts project into the slots of the lower doughnut 43, this doughnut is made similar in shape and construction to the upper doughnut simply for convenience of assembly.

The stirrup 28, 29 carrying the columnar unit 35 as described, is adapted to be swung on its trunnions 30, 31 from the vertical position shown in solid lines to the inclined position shown in dotted lines of Fig. 1 and retaining means, as hereinafter described, are provided to firmly hold the stirrup in either of said positions. When the columnar unit is in its inclined position, the basket 41 will have substantially one half thereof immersed in the water filled basin 15 as indicated by dotted lines in Fig. 1. This is the washing position for the basket and it will be understood that the spinner shaft 24 will be operated at the relative slow speed customary for such operation. The vertical position of basket 41 shown in solid lines of Fig. 1 is its spin dry position, and for this centrifuging operation the spinner shaft will be operated at relatively high speed as is well understood. During the spin dry operation the washing water will have been emptied from basin 15 and the latter will serve as a drainage sump for said spin drying.

As shown in Fig. 4, the bottom channel beam 5 is provided with a lock pin slot 52. When the columnar unit 35 is in vertical position the locking pin 34 is adapted to be engaged and locked in this slot by a latch 53 forming part of a latch lever 54 pivoted at 55 on said channel beam 5. Similarly when the columnar unit is tilted to its inclined position, as shown in dotted lines in Fig. 1, the locking pin 34 is locked in a slot 56 in the side wall strap 7 by means of a latch 57 pivoted at 58 on said side strap 7. A foot treadle lever 59 is pivoted at 60 upon the channel beam 5 (see Fig. 1) and is connected by a link 61 to the latch lever 54. The latter is connected by link 62, bell crank lever 63, and link 64 to the latch 57 whereby both of said latches may be simultaneously thrown to open or unlocking position by stepping on said foot treadle 59. A spring 65 is connected between the foot treadle lever 59 and the channel beam 5 in the manner shown in Fig. 1, and another spring 66 is connected between the strap 7 and the latch 57 shown in Fig. 4, whereby both of said springs act in a manner to yieldingly hold said latches 53 and 57 in their closed or locking positions. The latches are so formed that the locking pin 34 when moved into its respective slots 52 or 56 will automatically cam the latches 53 or 57 out of the way so as to be locked thereby.

Counterbalancing spring means are arranged for substantially carrying the weight of the columnar unit 35 when in its inclined position and also for imparting a slight thrust upon said unit in moving it home to its vertical position. This spring structure is duplicated at opposite sides of the stirrup and comprises (see Figs. 1 and 3) a strut rod 67 pivoted at its upper end to the stirrup side arm 28 below trunnion 30 and having its lower end slidable through a thimble 68 swivelly held in bracket 69 fastened to the channel beam 5 at the position shown. A coiled compression spring 70 is positioned between stop abutment 71 on said rod 67 and the thimble 68 so as to impart an upward thrust on rod 67. When the columnar unit is swung to its inclined position the line of thrust of said spring assembly for supporting the columnar unit indicated by the dot dash line 72 in said Fig. 1.

A reversing switch for the motor of the conventional type is indicated at 73 as being fixed to the side arm 28 of the stirrup. The cable of the electrical circuit leads from the outside power source to the switch is indicated at 74 and the cable for the circuit leads into the motor is indicated at 75. This reversible switch 73 has a spring pressed plunger 76 which is normally projected to its outer position for closing circuits to operate the motor in one direction and when pressed to its inward position it changes the circuits for reversing the motor in a well understood manner. A switch bracket abutment 77 is fixed to the channel beam 5 (see Fig. 4) in position so that when the stirrup and its columnar unit is swung to vertical position, as shown in Fig. 1, the switch abutment 77 will press against the plunger 76 and close the circuits for operating the motor in the direction for operating through its high speed transmission. When the stirrup and columnar unit are swung away from the vertical position, plunger 76 of switch 73 will move outwardly and close the circuits for reversing the motor so as to operate through its low speed transmission.

The upper portion of the motor shaft 38 projects from its motor housing part way through the transmission housing as shown in Fig. 6. The spinner shaft 24 is positioned above and in end to end coaxial relation with said motor shaft and is rotatably mounted in sleeve bearings within the neck tube 22 projecting upwardly from the transmission casing 40. A reduced lower end of said spinner shaft 24 carries an end bearing stud 80 which rests on a ball 81 carried in the upper end of the motor shaft 38.

The two-speed transmission between the motor shaft 38 and spinner shaft 24 is shown more particularly in Figs. 6 to 11 inclusive, and comprises an arrangement of differential planetary gearing which may be described as follows. A motor shaft pinion 82 keyed to the motor shaft 38 meshes with intermediate pinion 83, the latter meshing with a stationary ring gear 84 in the manner of an epicyclic gear train wherein the pinion 83 has an orbital travel around the ring gear 84 fixed to the motor housing by locking pins 85. The intermediate pinion 83 is integral with a similar pinion 86 above the same (except that pinion 86 has more teeth than pinion 83), and both said pinions 83 and 86 are rotatably mounted on a stud shaft 87 carried in a rotatable spider disk 88. The latter is fixed by key 89 to an inner sleeve 90 rotatable on the upper end of the motor shaft 38 through suitable bearing bushings. The pinion 86 meshes with a movable ring gear 91 formed at the lower end of an outer rotatable sleeve 92. It will be observed that the pinion connections just described are duplicated on the other side of the motor shaft, and that the entire transmission mechanism is symmetrically disposed around the axis of said motor and spinner shafts.

Figure 10:
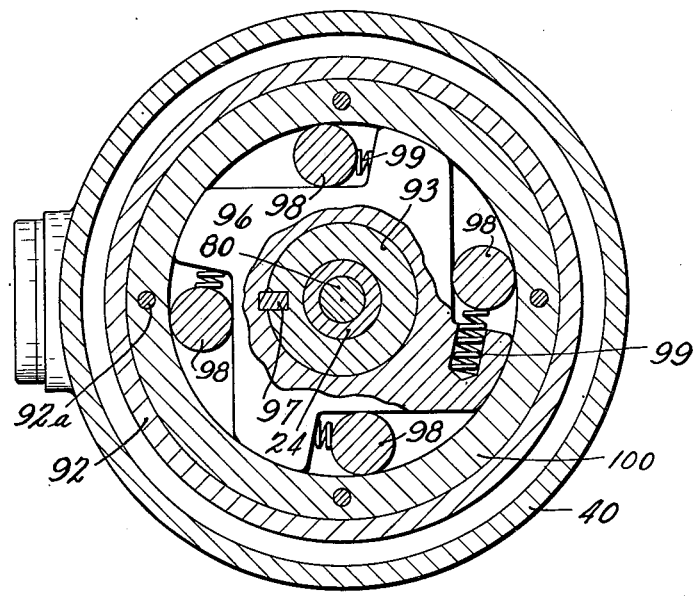

A clutch driven member 93 of stepped tubular formation is carried with its smaller diameter portion upon the lower reduced end of the spinner shaft 24 by a pin and slot connection indicated at 94 and 95 which allows a limited relative rotative movement between member 93 and the spinner shaft but does not permit vertical movement therebetween. An overrunning roller clutch for the low speed drive is mounted between the outer sleeve 92 and the aforesaid smaller end of the clutch driven member 93. As shown in Fig. 10, this overrunning clutch comprises the wedge member 96 fixed by key 97 to the clutch driven member 93 and is formed with the usual wedge pockets to receive the rollers such as 98 and roller backing springs such as 99, which rollers coact with a bearing ring 100 fixed to outer sleeve 92 by vertical pins 92a. It will be observed that this clutch of Fig. 10 will be active for driving the spinner shaft only when the outer sleeve 92 is rotated in anti-clockwise direction, looking down at Fig. 10. As will be later pointed out this is the low speed transmission drive.

Figure 11:
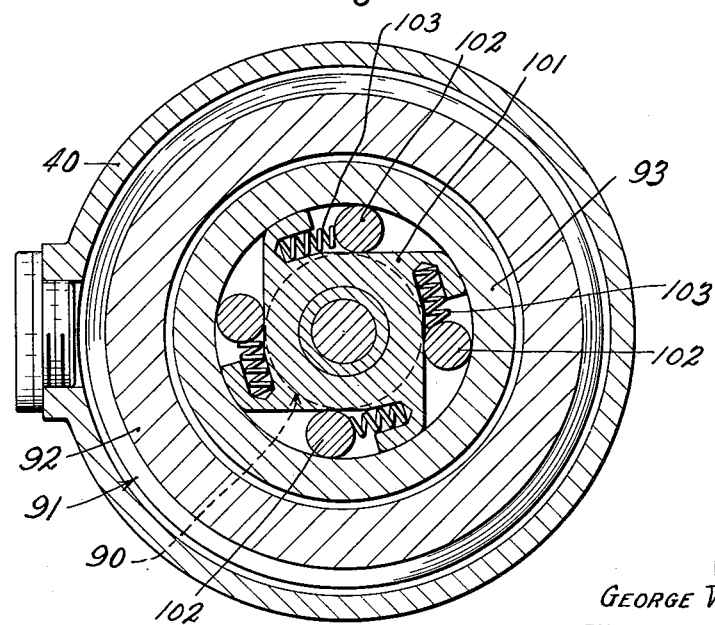

A similar overrunning roller clutch for the high speed drive, arranged in opposed relation to that of Fig. 10, is mounted between the interior enlarged end of the clutch driven member 93 and the outside of inner sleeve member 90. As shown in Fig. 11, this latter clutch comprises the wedge member 101 formed integral with the inner sleeve 90 and has the usual pockets for its rollers 102 and roller backing springs 103, which rollers coact with the inside of the enlarged end of the clutch driven member 93. It will be observed that said clutch driven member 93 will be driven by this latter clutch shown in Fig. 11 only when the inner sleeve member 90 rotates in its anti-clockwise direction, and that both said clutches of Fig. 10 and Fig. 11 serve to drive the spinner shaft in an anti-clockwise direction. The transmission, however, is such that the low speed clutch of Fig. 10 is active only when the motor shaft rotates clockwise and the high speed clutch of Fig. 11 is active only when the motor shaft rotates anti-clockwise.

The action of the foregoing transmission and clutch drives may be briefly reviewed as follows: When the motor shaft 38 rotates clockwise (looking down from the top), the pinion 82 meshing with lower pinion 83 causes the latter to travel in a clockwise direction around the fixed internal gear 84, see Fig. 7. The stud shaft 87 of said pinion 83 since it is carried in the spider disk 88 will thus cause the latter to rotate clockwise whereby the upper pinion 86 will also travel clockwise in engagement with its movable gear ring 91, see Fig. 9. The ratio of gear teeth in lower pinion 83 and fixed ring gear 84 is greater than the ratio of gear teeth between upper pinion 86 and its movable ring gear 91. In consequence of this differential ratio, one complete orbital travel through 360° of lower pinion 83 with its spider 88 carries the upper pinion 86 also through an orbital travel of 360° but without completing a circuit on its movable ring gear 91. Since the ring gear 84 is fixed, the movable ring gear 91 is compelled to move backward or anti-clockwise relative to said fixed gear 84 during the clockwise orbital travel of the pinions 83 and 86. The movable ring gear 91 thus being moved anti-clockwise carries the outer sleeve 92 in an anti-clockwise direction, while the motor shaft as above stated is rotating clockwise. The anti-clockwise rotation of said outer sleeve 92 will activate the upper clutch shown in Fig. 10. and thus drive the clutch driven member 93 in an anti-clockwise direction. The member 93 is coupled directly to the spinner shaft 24 by means later to be described, and the transmission just described is the low speed transmission for driving the spinner shaft at relatively low speed for washing.

When the motor shaft rotates in an anti-clockwise direction, the above transmission will be rendered idle by the upper overrunning clutch of Fig. 10. But the clutch driven member 93 and its spinner shaft will be driven at relatively higher speed by the transmission which may be traced as follows: The anti-clockwise rotation of motor shaft pinion 82 will cause the orbital travel of the lower pinion 83 and rotation of spider 88 in an anti-clockwise direction. The spider 88 is keyed to the inner sleeve 90 whereby the latter will also rotate in an anti-clockwise direction. It will be clear from Fig. 11, that when this sleeve 90 rotates anti-clockwise it activates the lower roller clutch so as to cause the same to drive the inside enlarged end of the clutch driven member 93. The latter member is coupled to the spinner shaft as previously stated, and the transmission just described will thus rotate the spinner shaft in an anti-clockwise direction at its relatively high rate of speed for centrifuging.

At the end of a spin dry or centrifuging operation with the spinner shaft rotating at relatively high speed, it is desirable to slow down the rotation of this spinner shaft quickly preparatory to rotating the same at lower speed for the washing operation, and for this purpose I have provided automatically acting brake mechanism which also serves as the coupling means between the clutch driven member 93 and the spinner shaft 24. The brake mechanism acts to slow down the spinner shaft 24 whenever the latter tends to overrun the clutch driven member 93. This action will occur whenever the high speed transmission begins to slow down preparatory to a reversal of the motor shaft.

Referring to Fig. 6, a cone surface brake member 104 has a splined connection at 105 to the upper end of the clutch driven member 93 so as to have a short vertical movement thereon. A coacting brake surface 106 is formed on the inside of the gear casing to coact with said cone brake 104. Raising of the cone member 104 brings the braking surfaces into contact, and the lowering of said member 104 releases the brake. Directly above the brake member is a coupling member 107 which has a sleeve portion surrounding the lower end of the spinner shaft 24 and is provided with an inclined cam slot 108 in one side of said sleeve into which extends a pin 109 fixed to the spinner shaft 24. The coupling member 107 has a lower flange portion 110 from which stud bolts 111 project through the cone brake 104 for connection to a brake lifter ring 112. A spring annulus 113 is interposed between the brake lifter ring 112 and the cone brake member 104.

In this manner the brake member 104 is fixed rotatively to clutch driven member 93 and its associated coupling member 107 has a lost motion connection rotatively with respect to said spinner shaft 24 which causes a vertical shift of said coupling and brake member dependent on the relative rotation of said parts. The pin and slot connection at 94 and 95 prevents vertical movement of said spinner shaft 24. From this construction it will be appreciated that when the spinner shaft 24 tends to overrun the clutch driven member 93, the pin 109 will cam the coupling member 107 upwardly and through the brake lifter 112 will cause the cone brake 104 to grip the surface 106 and slow down the rotation of said spinner shaft. Similarly when the clutch driven member 93 is driving the spinner shaft 24 through coupling member 107, the cam slot 108 will move the coupling member downwardly to release the brake.

The spinner basket 41 is of the general kidney shape formation as disclosed in my previous patent referred to and has the usual perforations in the side wall thereof. The reentrant shaped bottom of said basket has centrally located therein a flat disk portion 114 formed with an axial hollow stem 115 closed at the top which is adapted to snugly and removably fit upon the upper extended portion of the spinner shaft 24 as shown in Fig. 1. The spinner shaft has fixed thereto a basket support 116 of frustro-conic shape having top table portion 117 upon which the basket bottom disk 114 is adapted to rest. As shown in Figs. 1 and 16 the table 117 is provided with holes 118 and bottom disk 114 is provided with co-fitting driving pegs 119 whereby the basket and spinner shaft are rotatively united. If desired the basket support 116 may be appropriately weighted with some heavy material to assist in stabilizing the high speed rotation of said spinner shaft.

The spinner basket is also preferably divided into two separate compartments by a vertically disposed partition wall 120 extending diametrically across the same and fastened to the central stem of the basket by the half round clamp portions as shown in Fig. 15. The top entrance to the basket is partially closed by horizontal sector-like wings 121 symmetrically disposed as shown in said figure, and extending from opposite top edges of the partition 120 to the rim of said basket. These wings are designed to prevent any tumbling of the clothes out of the basket while being rotated in its inclined position. The purpose of dividing the basket into two equi-sized compartments as described is to facilitate a more equal distribution of the clothes therein at each side of the rotating spinner shaft particularly for the high speed operation of centrifuging.

What I claim is:

1. In a washing machine in combination, a tub, a basket, a rotatable spinner shaft upon the upper end of which said basket is carried for rotation in said tub, a motor and its shaft in end to end relation with the lower end of said spinner shaft, a transmission mechanism and its casing below said tub with said transmission being connected to said spinner shaft and being disposed in line therewith, a housing for said motor joined to the lower end of said transmission casing and together with spinner shaft and basket forming a columnar unit, means for supporting and holding the columnar unit for gyratory motion exclusively at the lower end of said motor housing and comprising a resilient rubber mounting arranged to receive and hold said lower end and stabilize the column from said end, said sole support for the column limiting gyration thereof during rotation of said spinner shaft and basket with said column above said support being free of restriction upon said limited gyratory movement.

2. In a washing machine in combination, a tub, a basket, a rotatable spinner shaft upon the upper end of which said basket is carried for rotation in said tub, a motor and its shaft in end to end relation with the lower end of said spinner shaft, a transmission mechanism and its casing below said tub with said transmission being connected to said spinner shaft and being disposed in line therewith, a housing for said motor joined to the lower end of said transmission casing and together with said spinner shaft and basket forming a columnar unit, means for supporting and holding the columnar unit for gyratory motion exclusively at the lower end of said motor housing and comprising a resilient rubber mounting arranged to receive and hold said lower end and stabilize the column from said end, said mounting including a fixed ring support and a pair of rubber rings in embracing relation to the lower ends of said motor housing, with one above and one below said fixed ring support, said sole support for the column limiting gyration thereof during rotation of said spinner shaft and basket with said column above said support being free of restriction upon said limited gyratory movement.

3. In a washing machine in combination, a tub, a basket, a rotatable spinner shaft upon the upper end of which said basket is carried for rotation in said tub, said tub having a base ring providing an opening with a radial clearance space through which said spinner shaft extends, a flexible boot for closing the radial clearance space between said base ring and said spinner shaft, a motor having its motor shaft in end to end relation with the lower end of said spinner shaft, transmission mechanism and its casing below said tub, a housing for said motor joined to the lower end of said transmission casing and together with said spinner shaft and basket forming a columnar unit, means for supporting said columnar unit wholly at the lower end of said motor housing comprising a stirrup depending from the base ring of said tub, and a resilient rubber mounting at the foot of said stirrup arranged to receive and hold the lower end of said housing in a manner to allow gyration of said unit upon said rubber mounting during high speed rotation of said basket.

4. In a washing machine in combination, a tub, a basket, a rotatable spinner shaft on the upper end of which said basket is carried for rotation in said tub, said tub having at its bottom a centrally disposed base ring in an inclined position providing an opening with a radial clearance space through which said spinner shaft extends, a flexible boot for closing the radial clearance space between said base ring and said spinner shaft, a motor and its shaft in end to end relation with the lower end of said spinner shaft, a transmission mechanism and its casing below said tub, a housing for said motor joined to the lower end of said transmission casing and together with said spinner shaft and basket forming a columnar unit, means for supporting said columnar unit wholly at the lower end of said motor housing comprising a depending stirrup pivotally hung from the base ring of said tub and having at its foot a mounting to receive and hold the lower end of said motor housing, said stirrup together wtih its supported columnar unit adapted to be tilted from a vertical position to an inclined position.

5. In a washing machine in combination, a main support cabinet, a tub positioned therein, a rotatable spinner shaft upon the upper end of which said basket is carried for rotation in said tub, a motor and its shaft in end to end relation to the lower end of said spinner shaft, transmission mechanism and its casing below said tub, a housing for said motor joined to the lower end of said transmission casing and together with said spinner shaft and basket forming a columnar unit, means for supporting said columnar unit wholly at the lower end of said motor housing comprising a depending stirrup pivotally hung at its upper end from the bottom of said tub, and having at its foot a mounting to receive and hold the lower end of said motor housing, said stirrup together with its supported columnar unit adapted to be tilted from a vertical position to an inclined position and latching means at the bottom of said cabinet to hold said unit in vertical position, and latching means at the side of said cabinet to hold said stirrup in its inclined position.

6. In a washing machine in combination, a main support cabinet, a tub positioned therein, a rotatable spinner shaft upon the upper end of which said basket is carried for rotation in said tub, a motor and its shaft in end to end relation to the lower end of said spinner shaft, transmission mechanism and its casing below said tub, a housing for said motor joined to the lower end of said transmission casing and together with said spinner shaft and basket forming a columnar unit, means for supporting said columnar unit wholly at the lower end of said motor housing comprising a depending stirrup pivotally hung at its upper end from the bottom of said tub, and having at its foot a mounting to receive and hold the lower end of said motor housing, said stirrup together with its supported columnar unit adapted to be tilted from a vertical position to an inclined position and latching means at the bottom of said cabinet to hold said unit in vertical position, latching means at the side of said cabinet to hold said stirrup in its inclined position, and a foot treadle device operative to simultaneously release both of said latching means.

7. In a washing machine in combination, a tub, a basket, a rotatable spinner shaft on the upper end of which said basket is carried for rotation in said tub, said tub having at its bottom a centrally disposed base-ring in an inclined position providing an opening with a clearance space through which said spinner shaft extends, a motor and its shaft in end to end relation with the lower end of said spinner shaft, a transmission mechanism and its casing below said tub, a housing for said motor joined to the lower end of said transmission casing and together with said spinner shaft and basket forming a columnar unit, means for supporting said columnar unit wholly at the lower end of said motor housing comprising a depending stirrup pivotally hung from the base ring of said tub and having at its foot a mounting to receive and hold the lower end of said motor housing, said stirrup together with its supported columnar unit adapted to be tilted from a vertical position to an inclined position, the bottom of said tub at one side of its base ring being projected downwardly to form a relatively deep basin adapted to receive said basket when the columnar unit is in its inclined position, the bottom of said tub at the opposite side of said ring sloping toward the deep basin of said tub.

8. In a washing machine in combination, a main support cabinet, a tub positioned therein, a rotatable spinner shaft upon the upper end of which said basket is carried for rotation in said tub, a motor and its shaft in end to end relation to the lower end of said spinner shaft, transmission mechanism and its casing below said tub, a housing for said motor joined to the lower end of said transmission casing and together with said spinner shaft and basket forming a columnar unit, means for supporting said columnar unit wholly at the lower end of said motor housing comprising a depending stirrup pivotally hung at its upper end from the bottom of said tub, and having at its foot a mounting to receive and hold the lower end of said motor housing, said stirrup together with its supported columnar unit adapted to be tilted from a vertical position to an inclined position, latching means at the bottom of said cabinet to hold said unit in vertical position, latching means at the side of said cabinet to hold said stirrup in its inclined position, and counterbalancing spring means mounted between said cabinet and said columnar unit constructed and arranged to yieldingly sustain said columnar unit either in its vertical position or in its inclined position.

9. In a washing machine in combination, a tub, a basket, a rotatable spinner shaft upon which said basket is carried for rotation in said tub, a motor, a low speed transmission for rotating said spinner shaft in a washing operation and a high speed transmission for operating said spinner shaft in centrifuging action, said motor, transmissions, and spinner shaft underlying said basket and being united together with the basket in one axial line as a columnar unit, means for supporting said unit which allows the same to be tilted from a vertical position to an inclined position, said supporting means leaving the basket free to gyrate in vertical position, an additional support holding the columnar unit when in inclinded position and preventing gyration of the basket in said inclined position, and means operated by the positioning of said unit vertically to render the high speed transmission active in rotating said spinner shaft, said means being operated by the tilting of said unit into an inclined position to render the low speed transmission active in rotating said spinner shaft.

10. In a washing machine in combination, a tub, a basket, a rotatable spinner shaft upon which said basket is carried for rotation in said tub, a reversible electric motor, a low speed transmission rendered active for rotating said spinner shaft when said motor operates in one direction, a high speed transmission rendered active for rotating said spinner shaft when said motor operates in the reverse direction, said motor transmissions, spinner shaft and basket being united together as a columnar unit, a pivotal support for said unit adapted for positioning said unit either vertically or inclined, a reversible switch for said motor automatically operated by the shifting of said unit from one position to the other, to cause said motor to operate through its high speed transmission when said unit is in vertical position and to reverse and operate through said low speed transmission when said unit is in inclined position.

11. In a washing machine in combination, a tub, a basket, a rotatable spinner shaft upon which said basket is carried for rotation in said tub, a reversible electric motor, a low speed transmission rendered active for rotating said spinner shaft when said motor operates in one direction, a high speed transmission rendered active for rotating said spinner shaft when said motor operates in the reverse direction, said motor transmissions, spinner shaft and basket being united together as a columnar unit, a depending stirrup pivotally hung from the bottom of said tub, a resilient mounting at the foot of said stirrup for supporting said columnar unit for a gyratory movement thereof, latching means for holding said stirrup and its supported unit in a vertical position or in an inclined position, and a reversible switch for said motor automatically operated by the shifting of said unit from one position to the other, to cause said motor to operate through its high speed transmission when said unit is in vertical position and to reverse and operate through said low speed transmission when said unit is in inclined position.

12. The combination in a washing machine of a tub, a rotatable and tiltable basket in the tub, a shaft connected to the basket and extending through the tub, a depending stirrup pivotally hung from the tub, a resilient mounting at the foot of the stirrup, a two-speed transmission unit having a reversible motor connected with the basket shaft and forming a columnar unit with the basket, the columnar unit being supported by the stirrup on the resilient mounting, said transmission unit being of the type to change speeds when the motor is reversed in its direction of rotation and including a braking device operable to slow down basket shaft rotation between higher and lower of the transmission speeds, a motor reversing switch, a bearing sleeve around the basket shaft, means connected with said sleeve to shift the columnar unit from a vertical position to an inclined tilted position, latching means to hold the columnar unit in tilted position, latch releasing means to allow the columnar unit to return to vertical position, and automatically operated devices controlled by the tilting of the columnar unit to set said motor reversing switch alternately to render the higher or lower speed of the transmission unit active in rotating the basket shaft according to whether the columnar unit is shifted to vertical or inclined positions respectively.

GEORGE W. DUNHAM.

REFERENCES CITED

The following references are of record in the file of this patent:

UNITED STATES PATENTS

| Number | Name | Date |
|---|---|---|
| 1,842,154 | Dunham | Jan. 19, 1932 |
| 1,905,114 | Lauterbur | Apr. 25, 1933 |
| 1,908,629 | Schenck | May 9, 1933 |
| 2,222,329 | Watts | Nov. 10, 1940 |
| 2,314,286 | Olcott | Mar. 16, 1943 |
| 2,366,236 | Clark | Jan. 2, 1945 |
| 2,381,894 | Ferris | Aug. 14, 1945 |
| 2,405,404 | Clark | Aug. 6, 1946 |

FOREIGN PATENTS

| Number | Country | Date |
|---|---|---|
| 277,666 | Great Britain | Oct. 11, 1928 |